United States Patent Office 3,041,247
Patented June 26, 1962

3,041,247
PROCESS FOR PRODUCING L-ISOLEUCINE
Kensuke Shimura, 68 Nakajima-cho, and Teijiro Uemura, 38 Hasekura-touri, both of Sendai, Miyagi Prefecture, Japan
No Drawing. Filed Apr. 7, 1960, Ser. No. 20,570
5 Claims. (Cl. 195—29)

This invention relates to process for the production of L-isoleucine, and has for its object to obtain the desired L-isoleucine by fermentation process inexpensively and with a high yield.

Other objects, features and advantages will be apparent from the following description.

A special feature of the process of the present invention resides in that when in culture of micro-organisms belonging to genus bacillus, a DL-α-amino-butyric acid is added to a culture medium containing carbohydrate, nitrogen compound and inorganic matters in a suitable concentration, a large quantity of L-isoleucine may be produced and accumulated in the medium, the resulting product thus obtained being isolated and recovered. It has been well known that L-isoleucine is an amino acid indispensable for the nutrition for higher animals and when this amino acid is deficient, animals can not maintain their lives. In recent years, furthermore, this amino acid is gathering a great attention in the physiological field as antianemic factor, and is in demand not only as a biochemical reagent but also as medicines, foods and feeds.

So far, L-isoleucine has been mainly synthesized by chemical process, and there are four isomers in this amino acid, and the removal of DL-alloisoleucine and the subsequent optical resolution were necessary in order to obtain a pure L-isoleucine. On the other hand, several attempts to isolate L-isoleucine from the hydrolysate of natural proteins have been made fruitlessly because of the difficulty to separate from L-leucine whose characteristics resemble those of L-isoleucine. The L-isoleucine, therefore, has been esteemed as one of the most valuable amino acids.

Recently, fermentation process by micro-organism has begun to be adopted as a process for the industrial production of L-amino acid. However, differing from other amino acids such as glutamic acid, alanine, valine, asparatic acid, leucine and the like, no instance wherein L-isoleucine has been accumulated in the medium has been reported. Judging from the fact that the process of biosynthesis of L-isoleucine is extremely complicated and peculiar in comparison with those of other amino acids described above, it will be seen that the fermentative production of L-isoleucine by means of usual culture method is very difficult.

Perceiving the fact that in culture of micro-organism a specific amino acid may be remarkably produced and accumulated in the medium by the addition of its precursor, the present inventors have executed numerous experiments and laborous studies for a long time about these precursors and the micro-organisms suitable for the fermentation and came to the conclusion that when in culture of the micro-organism belonging to genus bacillus a DL-α-aminobutyric acid is added to a culture medium, a large quantity of L-isoleucine can be accumulated in the medium, as already set forth above. The following table shows the results of the studies about a DL-α-aminobutyric acid, α-keto-butyric acid including its amids, DL-homoserine, DL-threonine and DL-allothreonine and the like as addition substances.

| No. of experiments | Substances added | Amount of L-isoleucine produced, mg./ml. |
|---|---|---|
| 1 | No substance added | 0.09 |
|   | α-Amino-isobutyric acid | 0.05 |
|   | DL-threonine | 0.29 |
|   | DL-homoserine | 0.13 |
|   | DL-asparatic acid | 0.10 |
|   | Crotonic acid | 0.06 |
|   | Butyric acid | 0.00 |
|   | Ethyl acetoacetate | 0.06 |
| 2 | No substance added | 0.05 |
|   | α-amino-(n)-butyric acid | 6.0 |
|   | DL-allothreonine | 1.20 |
|   | α-Keto-β-oxybutyric acid amide | 0.70 |
|   | α-Keto-butyric acid amide | 0.45 |
|   | α-Keto-butyric acid | 0.08 |

In the experiments, No. 1 in the above table; the cultivation was carried out under shaking at 30° C. for 3 days using a media containing 5% of glucose and 50 μm./ml. of the addition substance, and No. 2; the cultivation was carried while shaking at 30° C. for 5 days using a medium containing 10% of glucose and 10 μm/ml. of the addition substance.

As can be seen from the above table, it has been found that when an α-aminobutyric acid is added to a medium in an appropriate concentration, a large quantity of L-isoleucine can be accumulated. Furthermore, it has been ascertained, too, that if the cultivation is effected with the addition of DL-α-aminobutyric acid, various kinds of strains belonging to genus bacillus can be utilized for the production of L-isoleucine, and that if a carbon source, nitrogen source and inorganic matter are contained as the components of medium used for the fermentation in a proper concentration, both of an artificial medium and a natural medium can effectively be used. Any kind of substances which can be utilized for the micro-organisms to be used, such as glucose, cane sugar, molasses, maltose, starch, hydrolysate of starch and the like, can be used as the carbon source. Among these substances, the glucose and cane sugar bring about the most excellent results. Both of the inorganic salts such as ammonium salts, nitrates and the like and the organic nitrogen compounds such as urea, pepton, hydrolysate of protein, meat extracts, and asparagine can be used as a nitrogen source so far as the micro-organism to be used can be grown. In fact, many kinds of micro-organisms or strains can produce and accumulate a large quantity of L-isoleucine when DL-α-amino-butyric acid is added to the medium containing these substances.

According to the present invention, the fermentation can be carried out under shaking or violently passing an air over a culture medium added with DL-α-aminobutyric acid in the concentration of 0.005 to 1.5% by volume of the medium at pH values of 5.5 to 8.5 at 25 to 35° C. for from 1 day to several days, for example, for 1 day to 6 days. In the case where a glucose is used as carbon source, the best result is obtained when the said glucose is used in the concentration of 10% by volume of the medium. Furthermore, the production of L-isoleucine becomes greater and the period of fermentation can be shortened when the concentration of glucose is 5% by volume at the beginning of the fermentation and a further 5% by volume of the glucose is successively added to the medium in an early half stage of the fermentation, together with α-aminobutyric acid.

The conversion rate or yield from the DL-α-aminobutyric acid to L-isoleucine is usually of the order of about 60% in most cases and reaches 74% at highest, and furthermore, as leucine is not at all contained in the filtrate of the fermentation broth and other amino acids are also in a slight amount, the isolation of L-isoleucine from the filtrate of the fermentation broth is not difficult. Isolation of L-isoleucine from the filtrate of the fermentation broth can be carried out by the following procedure, namely, the filtrate of the fermentation broth is passed through a column filled up with Dowex-50 (H-type), a cation-exchange resin comprising a strongly acidic sulfonated copolymer of styrene and divinylbenzene as in U.S. Patent No. 2,366,007; to absorb aminobutyric acid completely in this ion-exchange resin and then the absorbed aminobutyric acid is eluted with a diluted sodium hydroxide solution. The eluate is again passed through several columns, for example 3 columns, set up under the aforesaid column, and the isoleucine fraction is isolated and then decolorized with activated carbon. Pure L-isoleucine is obtained finally by the repeated recrystallization from water-alcohol. On the other hand, DL-α-aminobutyric acid to be added to the medium can be synthesized very cheaply and easily, and this fact makes the production of L-isoleucine of the present invention to be very advantageous economically, in correlation with the above-mentioned easiness of the conditions of fermentation.

The working examples using several strains of bacteria are shown in the following but these examples illustrate only the way in which the process of the present invention can be carried out in practice, and all processes for the production of L-isoleucine, wherein media containing DL-α-aminobutyric acid are used, are included in the scope of the present invention even though bacteria, composition of media and other conditions of fermentation may differ from those in the following examples. The strains exemplified are all gram-positive, aerobic and sporulated rods and the motile strains are peripherally flagellated. They show catalase and are recognized as bacteria belonging to genus bacillus in the classification of bacteria. Being compared with the description in Bergey's Manual of Determinative Bacteriology, 6th edition, in regard to the taxonomic characteristics and more particularly to the growth on potato medium, milk medium, medium containing 7% salt, growth state under anaerobic condition, production of acid from mannitol, starch liquefaction and gelatine liquefaction, and utilization for various kinds of carbohydrates, these bacilli grow well on nutrient agar and show a somewhat lustrous creaming white to slightly yellowish state and their colonies are generally of irregular round and flat shape. Furthermore, the said bacilli are smooth while they are fresh but later wrinkled to wave form and the edge of agar colony becomes undulate to erose. They grow well on a potato medium and the colonies are of the grayish white, wrinkled, plait-rich and continuously undulate form. They also liquefy the gelatine to present the funnel or layer form and the starch liquefaction can be recognized in each case. In a liquid culture they form the superficial pellicle and grow well on the surface of medium. They grow also comparatively well on the medium containing 7% salt and some of them can grow even on the medium containing 10% salt. With regard to utilization of various kinds of carbohydrates, the formation of acid can be observed but not an evolution of gas. There are some strains, for example, strain No. 1, which well produce acid from a mannitol. As shown in the following table, there is a somewhat difference in characteristics of these strains, but judging from the morphological properties as well as physiological characteristics, they are considered to belong to those in the group consisting of Bac. megaterium, Bacillus subtilis and Bacillus licheniformis, that is, strain No. 1 belongs to Bacillus megaterium; No. 2 to Bacillus licheniformis, and No. 6, No. 14, No. 702 and No. 703 to Bacillus subtilis respectively.

| | *Bacillus megaterium* | Strain No. 1 | *Bacillus licheniformis* | Strains No. 2 to 4 |
|---|---|---|---|---|
| (1) Cell size (μ) | 1.2 x 1.5 x 2.0 x 4.0 (0.9–2.2 x 10 x 5.0). | 1.0–1.3 x 2.5–3.3 | 0.6–0.8 x 1.5–3.0 | 0.6–0.9 x 1.2–2.2. |
| (2) Gram strain | + (variable) | + | + | +. |
| (3) Motility | + (−) | − | + (−) | +. |
| (4) On milk medium | Peptonize | Peptonize | | Peptonize and produce weak acid. |
| (5) On medium containing 7% salt. | Grow | Grow well | Grow well | Grow well. |
| (6) Gelatine liquefaction | Liquefy slowly | Liquefy rapidly | Liquefy rapidly | Liquefy rapidly. |
| (7) Growth on glucose medium under anaerobic condition. | − | − | + | +. |
| (8) Production of acetyl methyl carbinol. | − | − | + | +. |
| (9) Production of acid from mannitol. | + | + | + | +. |
| (10) Production of acid from xylose | + | + | + | +. |
| (11) Production of acid from lactose | + or − | − | + or − | +. |
| (12) Production of acid from raffinose. | − | − | − | −. |

| | *Bacillus subtilis* | Strain No. 6 | Strain No. 14 | Strains No. 702-3 |
|---|---|---|---|---|
| (1) Cell size (μ) | 0.7–0.8 x 2.0 x 5.0 (0.6–1.0 x 1.3–6.0). | 0.5–0.9 x 1.3–2.2 | 0.5–0.9 x 1.1–1.7 | 0.6–0.9 x 2.2–2.8. |
| (2) Gram strain | + (variable) | + | + | +. |
| (3) Motility | + (−) | + | + | +. |
| (4) On milk medium | Peptonize and usually become alkaline. | Peptonize and produce weak acid. | Peptonize and produce weak acid. | Peptonize and produce weak acid. |
| (5) On medium containing 7% salt. | Grow well | Grow well | Grow | Grow very well. |
| (6) Gelatine liquefaction | Liquefy | Liquefy rapidly | Liquefy rapidly | Liquefy rapidly. |
| (7) Growth on glucose medium under anaerobic condition. | Grow scantily | − | − | −. |
| (8) Production of acetyl methyl carbinol. | + | + | + | +. |
| (9) Production of acid from mannitol. | + | − | + | −. |
| (10) Production of acid from xylose | + | + | − | +. |
| (11) Production of acid from lactose | + or − | + | + | +. |
| (12) Production of acid from raffinose. | − | + | − | −. |

NOTE.—(1) In the above table the description in parentheses ( ) concerns with the variant strain, and (2) blank column (_____) means no description.

This invention is further described in the following examples, which serve to illustrate the process of the production of L-isoleucine.

*Example 1*

Composition of medium: Glucose 10% by volume, urea 0.5% by volume, meat extract 0.2% by volume, pepton 0.2% by volume, dipotassium hydrogen phosphate 0.075% by volume, magnesium sulfate 0.03% by volume, DL-α-aminobutyric acid 1% by volume and pH of medium 8.0

The above-mentioned medium was alloted into 80 ml. and poured into 9 shaking flasks with 500 ml. capacity (totally 720 ml.), and *Bacillus subtilis* No. 14 was inoculated in the each flasks and cultured at 30° C. for 5 days under shaking. After culture, cells were separated by centrifugation and 670 ml. of a brown clear solution was obtained. Isoleucine content was 6.32 mg./ml. (yield 63.2%) and total quantity of isoleucine was 4.23 gr.

The solution thus obtained was passed through a column (3.3 x 11 cm.) filled up with Dowex-50 (H-type) and amino acid was absorbed completely, which was then eluted with a diluted sodium hydroxide solution. The eluate was again passed through 3 columns (2.2 x 11 cm., 1.0 x 1.5 cm. and 0.4 x 7 cm.) set up under the aforesaid column, and the fraction of isoleucine was isolated and decolorized with activated carbon. By repeated recrystallization from water-alcohol, 1.37 gr. of pure L-isoleucine was obtained. After purifying by further recrystallization, this product was compared with the authentic sample of L-isoleucine for its properties and was proved to have exactly the same properties as those of L-isoleucine and to be L-isoleucine, as follows.

(1) Crystalline form: thin hexagonal crystal (recrystallized from water-alcohol).
(2) M.P.: 282–283° C. (in sealed tube).
(3) $[\alpha]_D^{20} = +39.9°$ (2.7 gr./100 ml.; 6 N—HCl, 1=1).
(4) M.P. of picronate: becomes brown from at about 120° C. slowly and melts at 178° C.
(5) M.P. of acetylated derivative: 149–150° C. (No depression of melting point was observed in all products, admixed with the authentic samples.)
(6) Growth promoting effect for *Leuconostoc mesenteroides* of the product was exactly the same as that of authentic L-isoleucine.
(7) Infra-red absorption spectrum of the product was coincided with that of authentic L-isoleucine.

*Example 2*

This invention was carried into effect using various kinds of the strains of genus bacillus under the same cultural and other conditions as those in Example 1. The results are as follows:

| Strain | Period of fermentation (days) | Quantity of produced L-isoleucine (mg./ml.) | Yield from DL-α-aminobutyric acid (percent) |
|---|---|---|---|
| *Bacillus megaterium* Strain No. 1 | 5 | 4.8 | 48 |
| *Bacillus subtitis* Strain No. 702-3 | 5 | 2.9 | 2.9 |
| *Bacillus licheni fomris* Strain No. 12-4 | 5 | 1.3 | 13 |
| *Bacillus subtilis* Strain No. 6 | 5 | 2.8 | 28 |

*Example 3*

In carrying out the cultivation in the same manner as in Example 1, the concentration of glucose and DL-aminobutyric acid was respectively 5% and 0.5% at the beginning of the cultivation and further 25 mg./ml. of glucose and 0.5 mg./ml. of DL-aminobutyric acid were added twice after 24 hours and 48 hours.

By this process a larger quantity of L-isoleucine was produced and the period of fermentation could be shortened to 4 days.

L-isoleucine content produced in the broth_____ 7.40 mg./ml. (yield 74%).
Total quantity of isoleucine_ 4.96 gr.

Procedure of purification of L-isoleucine produced was the same as that in Example 1.

What we claim is:

1. A process for producing L-isoleucine which comprises adding 0.005–1.5% by volume, based on the volume of the medium, of DL-α-aminobutyric acid to a synthetic medium containing carbon source, nitrogen source and inorganic matters and culturing a micro-organism belonging to a species selected from the class consisting of *Bacillus subtilis*, *Bacillus megaterium* and *Bacillus licheniformis* on the said medium at pH values of 5.5 to 8.5, at 25 to 35° C. for from 1 to 6 days, whereby L-isoleucine is produced in the presence of DL-α-aminobutyric acid and accumulated in the medium, the isoleucine thus accumulated being then isolated.

2. The process for producing L-isoleucine as claimed in claim 1, wherein the carbon source is selected from the group consisting of glucose, cane sugar, molasses, maltose, starch and its hydrolysate, and the nitrogen source is selected from the group consisting of inorganic salts and organic compounds.

3. The process for producing L-isoleucine as claimed in claim 1, wherein DL-α-aminobutyric acid is not added previously to the synthetic medium and added thereto at the time of the cultivation.

4. The process for producing L-isoleucine as claimed in claim 2, wherein glucose is used as a carbon source, and at the beginning of fermentation the concentration of the glucose is 5% by volume of the medium and in an early half stage of the fermentation a further 5% by volume of glucose is added together with DL-α-aminobutyric acid.

5. A process for recovering L-isoleucine which comprises culturing a micro-organism belonging to a species selected from the class consisting of *Bacillus subtilis*, *Bacillus megaterium* and *Bacillus licheniformis* in the presence of 0.005–1.5% by volume, based on the volume of the medium, of DL-α-aminobutyric acid at pH values of 5.5 to 8.5, at 25–35° C. for from 1 to 6 days on a medium containing carbon source, nitrogen source and inorganic matters; passing the filtrate of the fermentation broth through a column containing ion-exchange resin; eluting the amino acid, which is absorbed completely in the said ion-exchange resin, with a diluted sodium hydroxide solution and isolating the isoleucine fraction from the eluate through the intermediary of several columns set up under the aforesaid column.

References Cited in the file of this patent

Herrmann et al.: Journal of Biological Chemistry, vol. 227, pages 1109 to 1116 (1957).